United States Patent
Jefferson et al.

(10) Patent No.: US 7,734,043 B1
(45) Date of Patent: *Jun. 8, 2010

(54) ENCRYPTION KEY OBFUSCATION AND STORAGE

(75) Inventors: David Jefferson, Morgan Hill, CA (US); Martin Langhammer, Wiltshire (GB); Keone Streicher, San Ramon, CA (US); Juju Joyce, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 1499 days.

This patent is subject to a terminal disclaimer.

(21) Appl. No.: 11/042,032

(22) Filed: Jan. 25, 2005

(51) Int. Cl.
  *G06F 9/00* (2006.01)
  *H04K 1/00* (2006.01)
  *G06F 9/24* (2006.01)
(52) U.S. Cl. .................. 380/37; 713/1; 713/189
(58) Field of Classification Search .............. 380/37; 713/1, 189
  See application file for complete search history.

(56) References Cited

U.S. PATENT DOCUMENTS

| | | | |
|---|---|---|---|
| 4,598,170 A * | 7/1986 | Piosenka et al. ............ 713/190 |
| 4,812,675 A | 3/1989 | Goetting |
| 6,212,639 B1 * | 4/2001 | Erickson et al. ............ 726/26 |
| 6,996,713 B1 * | 2/2006 | Trimberger ................ 713/161 |
| 7,028,191 B2 * | 4/2006 | Michener et al. ........... 713/182 |
| 7,197,647 B1 * | 3/2007 | Van Essen et al. .......... 713/189 |
| 7,299,203 B1 | 11/2007 | Nelson |
| 7,325,141 B2 * | 1/2008 | Chow et al. ................ 713/183 |
| 2002/0114455 A1 | 8/2002 | Asahi et al. |
| 2002/0145931 A1 | 10/2002 | Pitts |
| 2002/0199110 A1 * | 12/2002 | Kean ........................... 713/189 |
| 2004/0186991 A1 * | 9/2004 | Kobayashi et al. .......... 713/153 |
| 2005/0113070 A1 | 5/2005 | Okabe |

OTHER PUBLICATIONS

Office Action from U.S. Appl. No. 11/435,416 dated Sep. 19, 2007.
Office Action from U.S. Appl. No. 11/435,416 dated Mar. 26, 2008.
Hoflich, Wolfgang; "Using the XC4000 Readback Capability"; Xilinx XAPP 015.000, http://xgoogle.xilinx.com/search?q=XAPP%20015.000&spell=1&filter=0&access=p&output=xml_no_dtd&ie=UTF-8&client=xilinx&site=EntireSite&oe=UTF-8&proxystylesheet=xilinx, pp. 8-37 thru 8-44, downloaded on Mar. 6, 2006.
Office Action from U.S. Appl. No. 11/042,019 dated Oct. 21, 2008.
Office Action from U.S. Appl. No. 11/042,937 dated Nov. 28, 2008.

* cited by examiner

*Primary Examiner*—Kambiz Zand
*Assistant Examiner*—William S Powers
(74) *Attorney, Agent, or Firm*—Townsend and Townsend and Crew LLP (57) ABSTRACT

Circuits, methods, and apparatus that prevent easy detection and erasure or modification of an encryption or encoding key. This key may be used to encode and decode a configuration bitstream for an FPGA or other programmable or configurable device. One embodiment of the present invention obfuscates a key then stores it in a memory array on an FPGA. This memory array may be a one-time programmable memory to prevent erasure or modification of the key. After retrieval from storage, a reverse or de-obfuscation is performed to recover the key. Further obfuscation may be achieved by proper layout of the relevant circuitry.

19 Claims, 10 Drawing Sheets

ENCRYPTION KEY OBFUSCATION AND STORAGE

BACKGROUND

The present invention relates to configuring field programmable gate arrays generally, and more particularly to protecting configuration bitstreams from detection or alteration.

Field programmable gate array (FPGA) devices are logic or mixed signal devices that may be configured to provide a desirable user-defined function. FPGAs are typically configured using data provided by a configuration device. This data may be referred to as a configuration bitstream or program object file (POF). This bitstream opens and closes switches formed on an FPGA such that desired electrical connections are made.

Modern FPGAs contain hundreds of thousands of logic gates, as well as processors, memories, dedicated analog function blocks, and other circuits. This extensive circuitry requires a correspondingly long configuration bitstream to configure it. For example, 55 Megabits of configuration data are now needed by some FPGAs.

This configuration data represents an FPGA user design that is the outcome of a huge investment in manpower and research and development costs, often in the million dollar range. To protect this investment, these bitstreams are often encrypted. The encrypted bitstream is decrypted using a key stored on the FPGA, and the FPGA is then configured. While an FPGA is being configured, the bitstream that is susceptible to detection is encrypted and thus protected from theft.

Unfortunately, problems remain even with the use of encryption. If the encryption key can be determined, for example by examining an FPGA, the encrypted bitstream can be copied and the protected device can be cloned. Also, if the key can be erased or modified, then the protected device can be reconfigured to perform a new function. This can be particularly problematic if the device is performing an important function, such as network security.

Thus, what is needed are circuits, methods, and apparatus that provide keys for encryption and other types of encoding that cannot readily be determined by inspection and cannot be erased.

SUMMARY

Accordingly, embodiments of the present invention provide circuits, methods, and apparatus that prevent easy detection and erasure or modification of an encryption or encoding key. This key may be used to encode and decode a configuration bitstream for an FPGA or other programmable or configurable device, or it may be used on any device where preventing detection and erasure or modification of information is desirable.

An embodiment of the present invention obfuscates then stores a key in a non-volatile memory array, such as a one-time programmable memory array, on an FPGA or other integrated circuit to prevent its erasure or modification. After retrieval from storage, a reverse obfuscation is performed to recover the key. Further obfuscation may be achieved during layout of the obfuscation, reverse obfuscation, and memory array circuits. In a specific example, the obfuscation is done by permutation and inversion circuits. In another specific embodiment, the obfuscation is performed by an encryption circuit. Other forms of obfuscation may be used consistent with embodiments of the present invention. Various embodiments of the present invention may incorporate one or more of these and the other features described herein.

A better understanding of the nature and advantages of the present invention may be gained with reference to the following detailed description and the accompanying drawings.

DESCRIPTION OF EXEMPLARY EMBODIMENTS

Figure 1:
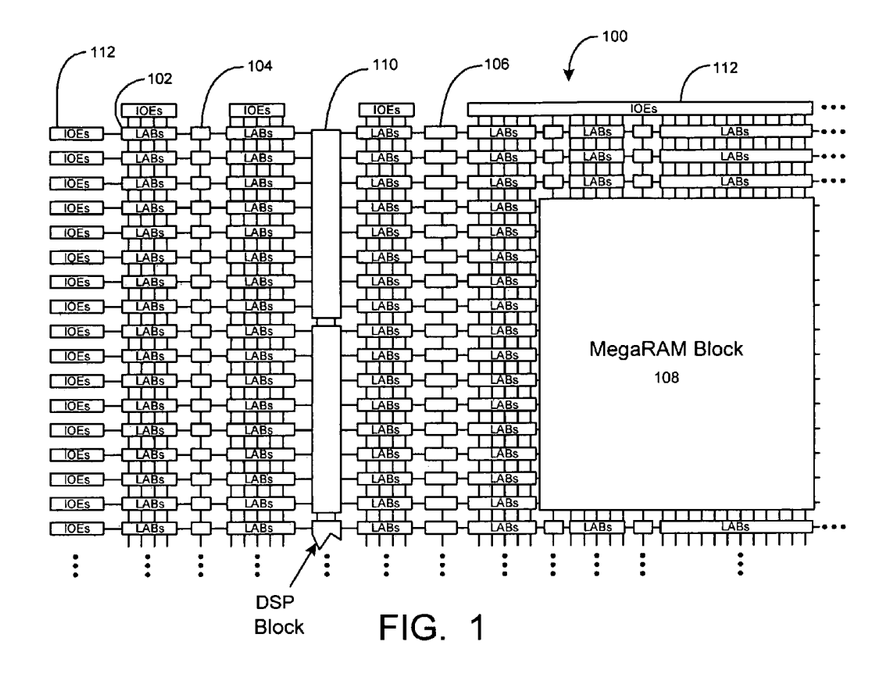
FIG. 1 is a simplified block diagram of a programmable logic device that is benefited by the incorporation of embodiments of the present invention.

FIG. 1 is a simplified partial block diagram of an exemplary high-density programmable logic device 100 wherein techniques according to the present invention can be utilized. PLD 100 includes a two-dimensional array of programmable logic array blocks (or LABs) 102 that are interconnected by a network of column and row interconnections of varying length and speed. LABs 102 include multiple (e.g., 10) logic elements (or LEs), an LE being a small unit of logic that provides for efficient implementation of user defined logic functions.

PLD 100 also includes a distributed memory structure including RAM blocks of varying sizes provided throughout the array. The RAM blocks include, for example, 512 bit blocks 104, 4K blocks 106 and an M-Block 108 providing 512K bits of RAM. These memory blocks may also include shift registers and FIFO buffers. PLD 100 further includes digital signal processing (DSP) blocks 110 that can implement, for example, multipliers with add or subtract features.

It is to be understood that PLD 100 is described herein for illustrative purposes only and that the present invention can be implemented in many different types of PLDs, FPGAs, and the other types of digital integrated circuits.

Figure 2:
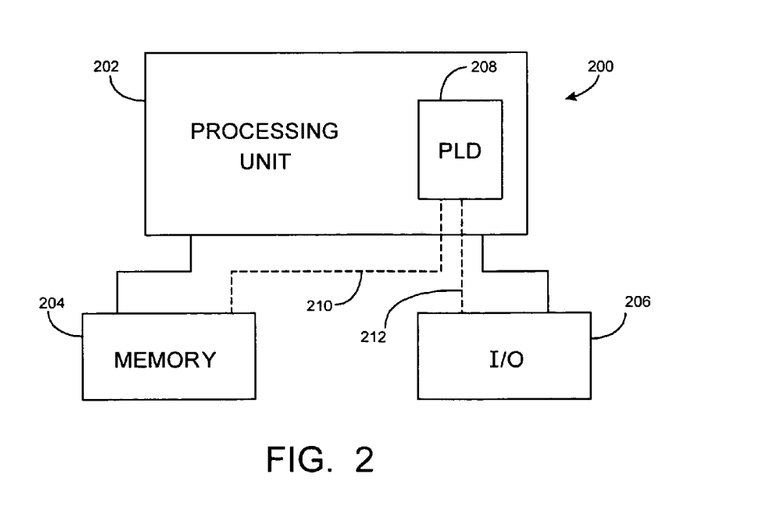
FIG. 2 is a block diagram of an electronic system that is benefited by the incorporation of embodiments of the present invention.

While PLDs of the type shown in FIG. 1 provide many of the resources required to implement system level solutions, the present invention can also benefit systems wherein a PLD is one of several components. FIG. 2 shows a block diagram of an exemplary digital system 200, within which the present invention may be embodied. System 200 can be a programmed digital computer system, digital signal processing system, specialized digital switching network, or other processing system. Moreover, such systems may be designed for a wide variety of applications such as telecommunications systems, automotive systems, control systems, consumer electronics, personal computers, Internet communications and networking, and others. Further, system 200 may be provided on a single board, on multiple boards, or within multiple enclosures.

System 200 includes a processing unit 202, a memory unit 204 and an I/O unit 206 interconnected together by one or more buses. According to this exemplary embodiment, a programmable logic device (PLD) 208 is embedded in processing unit 202. PLD 208 may serve many different purposes within the system in FIG. 2. PLD 208 can, for example, be a logical building block of processing unit 202, supporting its internal and external operations. PLD 208 is programmed to implement the logical functions necessary to carry on its particular role in system operation. PLD 208 may be specially coupled to memory 204 through connection 210 and to I/O unit 206 through connection 212.

Processing unit 202 may direct data to an appropriate system component for processing or storage, execute a program stored in memory 204 or receive and transmit data via I/O unit 206, or other similar function. Processing unit 202 can be a central processing unit (CPU), microprocessor, floating point coprocessor, graphics coprocessor, hardware controller, microcontroller, programmable logic device programmed for use as a controller, network controller, and the like. Furthermore, in many embodiments, there is often no need for a CPU.

For example, instead of a CPU, one or more PLD 208 can control the logical operations of the system. In an embodiment, PLD 208 acts as a reconfigurable processor, which can be reprogrammed as needed to handle a particular computing task. Alternately, programmable logic device 208 may itself include an embedded microprocessor. Memory unit 204 may be a random access memory (RAM), read only memory (ROM), fixed or flexible disk media, PC Card flash disk memory, tape, or any other storage means, or any combination of these storage means.

Figure 3A:
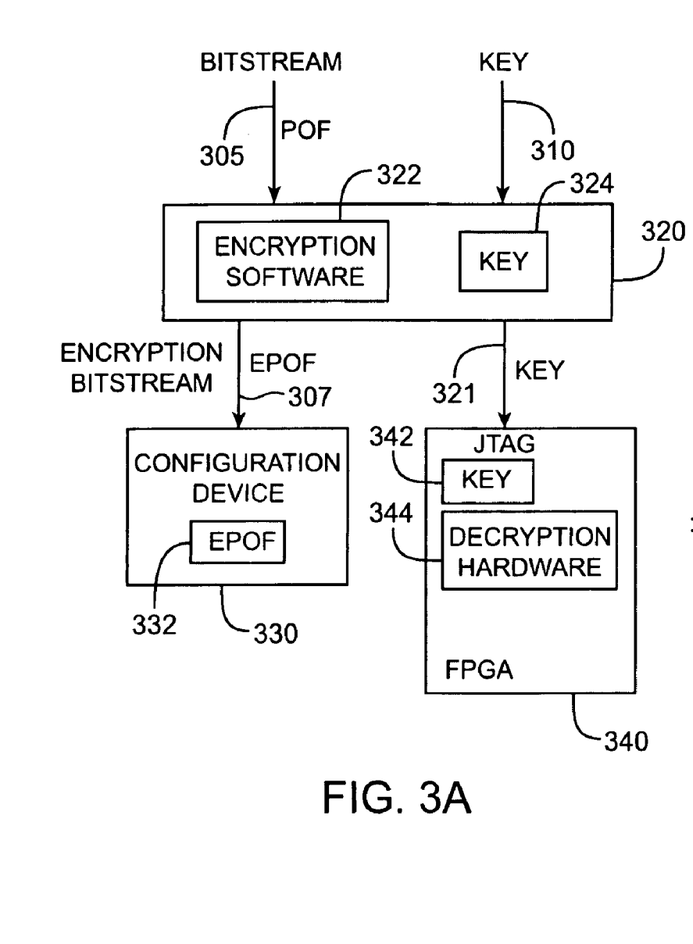
FIGS. 3A and 3B illustrate circuits and software that are benefited by the incorporation of embodiments of the present invention.
Figure 3B:
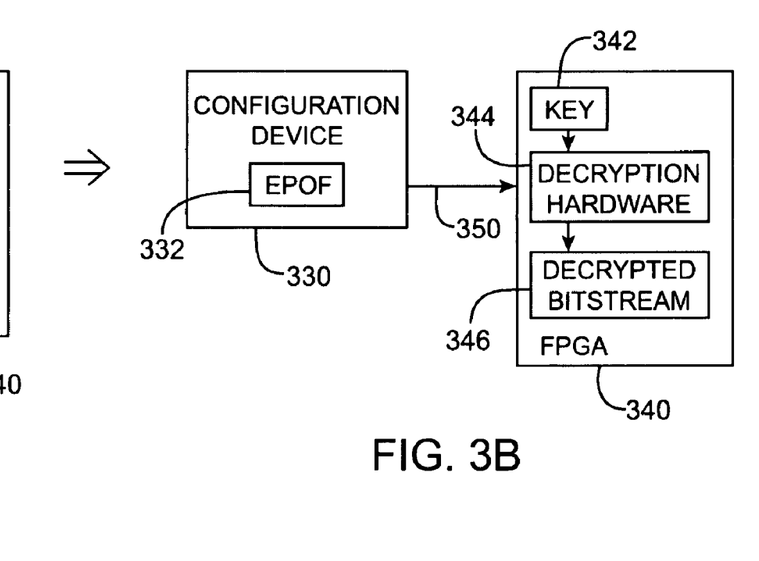

FIGS. 3A and 3B illustrate circuits and software that are improved by incorporating embodiments of the present invention. These circuits and software may be used to provide encrypted configuration information to field programmable gate arrays. Specifically, FIG. 3A illustrates the loading of an encrypted bitstream into a configuration device and a key into a field programmable gate array, while FIG. 3B illustrates the loading of the encrypted bitstream from the configuration device to be FPGA.

FIG. 3A includes a software package 320 that further includes encryption software 322 and key storage and handling software 324, a configuration device for storing an encrypted bitstream 332, and a field programmable gate array including storage locations for key storage 342 and decryption hardware 344. A bitstream is loaded into the encryption software routine 322 via software interface 305. The encryption software encrypts the bitstream and provides an encrypted bitstream through interface 307 to the configuration device 330, where it is stored as an encrypted bitstream 332. Similarly, a key is provided by a user over interface 310 to key handling software 324 which provides the key over interface 321 to the FPGA 340. The key is stored in locations 342 for use by the decryption hardware 344.

FIG. 3B includes a configuration device that further includes encrypted bitstream 332, and field program gate array 340 including key storage 342 decryption hardware 344 and a decrypted bitstream 346. At power up, during a fault condition, or other appropriate time, the encrypted bitstream 332 is provided by the configuration device 330 over interface 350 to the decryption hardware 344 in the field programmable gate array 340. The decryption hardware 344 also receives the key 342 stored on the field programmable gate array 340 and provides a decrypted bitstream 346. The decrypted bitstream 346 is then used to configure the FPGA such that it provides the desired logic function.

In typical applications, the activities illustrated in FIG. 3 occur either at a location (for example, their factory) under control of the field programmable gate array manufacturer (vendor) or purchaser, while the activities illustrated in FIG. 3B occur once the field programmable gate array is incorporated in an end product. Accordingly, since only the encrypted bitstream is available for detection over interface 350 in FIG. 3B, the original un-encrypted bitstream is protected from discovery.

Figure 4:
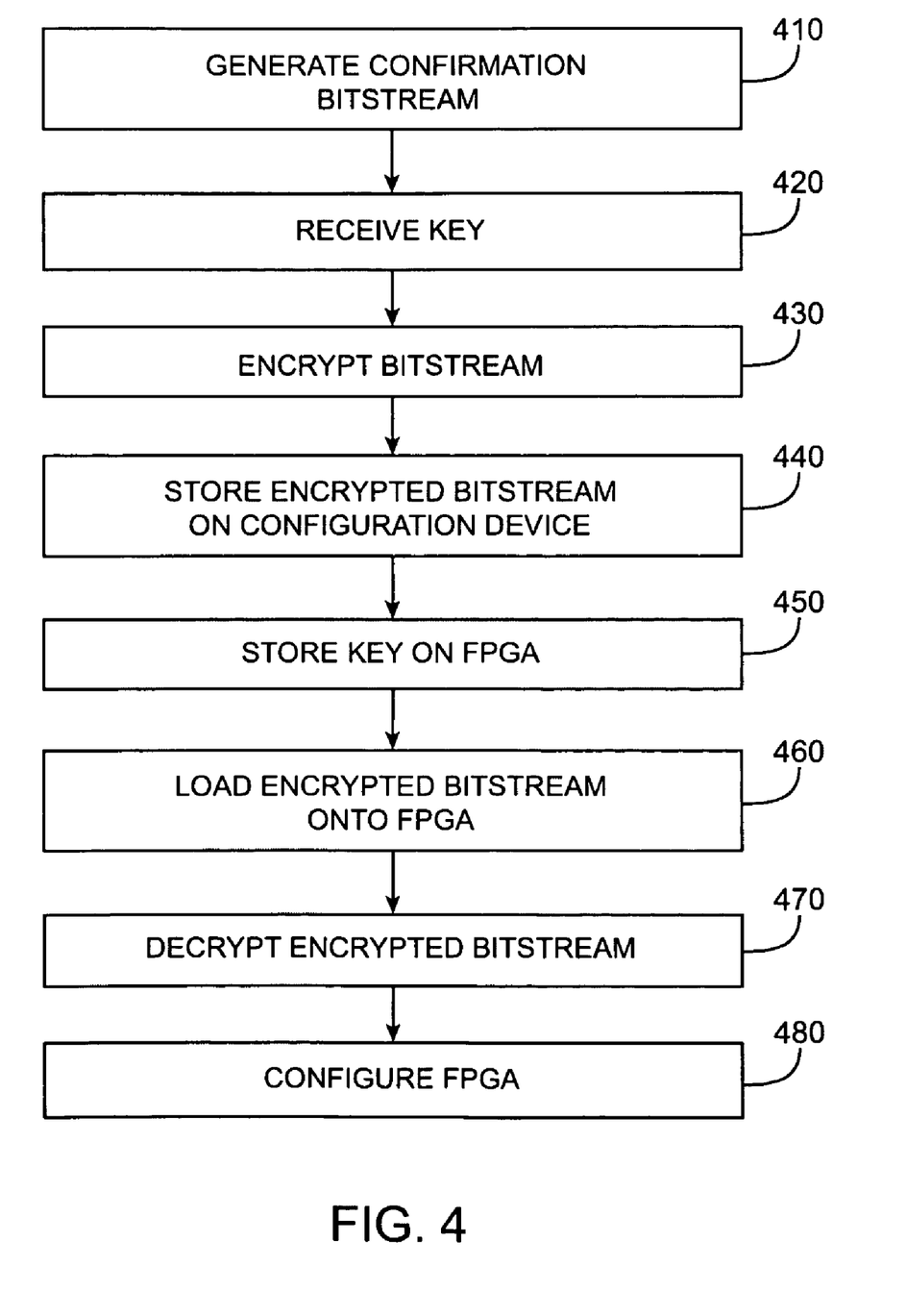
FIG. 4 illustrates a method of configuring a field programmable gate array that is improved by incorporating embodiments of the present invention.

FIG. 4 illustrates a method of configuring a field programmable gate array that is improved by incorporating embodiments of the present invention. In act 410, a configuration bitstream is generated. The configuration bitstream may be generated using design software such as VHDL (Very High Speed Integrated Circuit Hardware Description) Language or Verilog. In act 420, an encryption key is received, for example from a user, database, look-up table or other source. Alternately, the software program may generate its own key, or suggest a key to the user. In act 430, the key is used to encrypt the configuration bitstream, and in act 440, the encrypted bitstream is stored on a configuration device. This configuration device may be a flash memory or other nonvolatile memory device, such as a memory with a self-contained battery backup. The configuration device may be an integrated circuit, compact flash card, or other device. In act 415, the key is stored on a field programmable gate array or other programmable or configurable device. The acts to this point are typically performed at a location under the control of the field programmable gate array vendor or purchaser such as an original equipment manufacturer (OEM).

The following acts typically occur at power up, after a fault or error condition, or at other appropriate times while the FPGA is in use in an electrical system. In act 460, the encrypted bitstream is loaded from the configuration device to the field programmable gate array. In act 470, the encrypted bitstream is decrypted in the FPGA and used to configure the FPGA in act 480. This configuration act configures the FPGA such that it performs the desired function.

Figure 5:
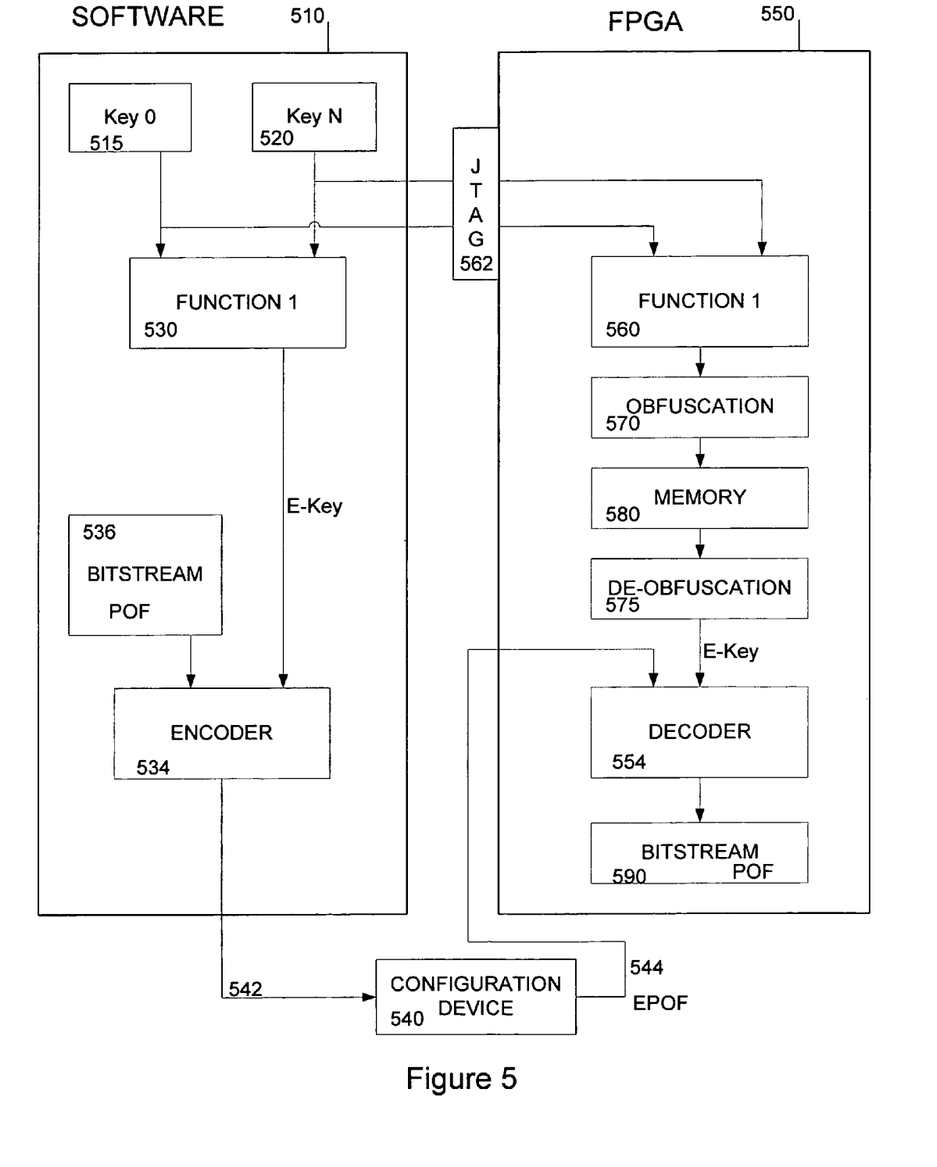
FIG. 5 illustrates circuits, software, and methods used to encode and decode a configuration bitstream according to an embodiment of the present invention.

FIG. 5 illustrates circuits, software, and methods used to encode and decode a configuration bitstream according to an embodiment of the present invention. This figure includes a software program or module 510, configuration device 540, and field programmable gate array 550. This figure, as with the other included figures, is shown for illustrative purposes and does not limit either the possible embodiments of the present invention or the claims.

Software module 510 receives one or more keys, Key 0 515 through Key N 520, from a user, other software program or module, or other appropriate source. For example, one or more of these keys may be provided by the software program 510. Quartus, available from Altera Corporation in San Jose, Calif. is an example of a program that may be used as program 510. Alternately, these keys may be provided by a user, they may be provided or suggested by software, found in a look-up table or other source, or provided in some other manner. The number of keys actually used may be one, two, or more than two.

These keys are received by software module Function 1 530, which performs a first function on the keys to generate an output. This function, as with the other function blocks in this and the other included figures, may include encryption, scrambling, exclusive-ORing, or combination of any of these or other functions. For example, one key may be encoded by a second key using encryption consistent with the data encryption standard (DES), the triple data encryption standard (3DES), or the advance encryption standard (AES). The output of the software module Function 1 530 and the configuration bitstream or program object file 536 are received by a second software module, the encoder 534. This encoder may perform the same function as the first software module Function 1 530, or it may perform a different function. The output of the second software module, the encoder 534, provides a masked or encoded configuration bitstream. This encoded bitstream (or encoded program object file, E-POF) is then provided on bus 542 to the configuration device 540. Typically, the configuration device 540 is sold with one or more field programmable gate arrays 550 and they are all then incorporated into an end product. In various embodiments, the configuration device is incorporated as part of the FPGA 550.

The keys, Key 0 515 through Key N 520, are also provided to FPGA 550, for example through a JTAG (Joint Test Action Group, IEEE standard 1149.1) or other appropriate interface 562. The FPGA may be an FPGA manufactured by Altera Corporation. The FPGA 550 incorporates a first function block, Function 1 560, which receives the keys Key 0 515 through Key N 520. The first function block, Function 1 560, performs a function on them to generate an encoded key, E-Key. This function may be the same as the function performed by the first software module Function 1 530. Again, this function may include encryption, exclusive ORing, scrambling, or other function or combination of these or other functions. The encoded key, E-Key, is then received by an obfuscation circuit 570. The obfuscation circuit 570 acts to disguise the encoded E-Key. The disguised encoded key is stored in a memory array 580. In this way, even if the contents of the memory array 580 are discovered, the encoded E-Key is protected.

Again, the encoded key E-Key is disguised from detection. Specifically, the encoded key itself is not stored, rather a version that has been obfuscated in some way is stored. Further, in a specific embodiment, the key is safe from erasure or modification since the key is stored in an array of one-time programmable fuses. In other embodiments, the key may be stored in a programmable memory array, where after the key is stored, the write-enable line or path to the memory is cut or otherwise disabled.

In typical applications, the configuration bitstream is encoded and stored in a configuration device, and the encoded E-Key is stored in the memory array 580 in the device manufacturer or customer's factory. Once the device is in an end product and is being configured, the following activities occur.

The output of the memory array 580 is received by reverse or de-obfuscation circuit 575 which reconstructs the original encoded key, E-Key. A second function block, the decoder 554, receives the encoded key, E-Key, and the encoded bitstream from the configuration device 540, and provides a decoded configuration bitstream 590 to the FPGA 550. This second function block, the decoder 554, may perform the same function as the function performed by the second software module 534 (or its reverse). Again, this function may include encryption (or decryption), exclusive-ORing, scrambling (descrambling), or other function, reverse of these or other functions, or combination of these or other functions. The FPGA is then configured using the decoded configuration bitstream 590.

In this way, the key stored in the memory array 580 is different from the key used to decode the encoded configuration bitstream. Accordingly, even if the contents of the memory array 580 are discovered, for example by reverse engineering, the encoded E-Key and the configuration bitstream remain protected.

It should be noted that multiple, separate function circuits are shown. In this example, a first function block, Function 1 560, and second function block, the decoder 554, are shown. In typical embodiments, these are one function block circuit that is reused multiple times. For example, multiplexers at the circuit input and output may be used to direct data to and from the function block at different points in the circuit's operation. In a typical embodiment, this circuit is a dedicated, hardwired circuit, since the encoded configuration bitstream is not available to configure it. In other embodiments, the circuitry may be configurable and configured by bits that are either included in a portion of the bitstream that is not encoded, hardwired into the integrated circuit, or provided in some other appropriate manner. Similar concepts apply to the software program modules included in these figures.

Again, the function blocks may provide or include an encryption (or decryption) function. This encryption function may be stand-alone or part of a larger function. The encryption may be AES, though other encryption circuits may be used, for example 3DES, or simply DES circuits, or other proprietary encryption algorithms may be used. Also, unconventional numbers of rounds of encryption may be used. For example, instead of a conventional 10 rounds of AES encoding, 5, 15, or other numbers of rounds may be used. In the future there will be other encryption schemes that will certainly be developed and may alternately be used. In a specific embodiment of the present invention, one or more keys having a length of 128 bits are used, though other lengths, such as 192 and 265 bits, may be used. Also, each device may have an individual key, each design may have a common key, each customer may have a key, or other arrangements may be made.

Again, in some embodiments of the present invention, erasure and modification of the key is prevented by storing the key in a number of one-time programmable fuses. These fuses are typically polysilicon fuses that are either blown or left as a connection. Alternately, as mentioned above, the fuses may be replaced by other nonvolatile memory structures, for example where the means for writing or erasing data stored in the memory structures is permanently disabled once the key is written. For example, a flash memory may be used, where the write enable line is disabled by blowing a fuse once the key is written. This type arrangement removes the necessity of a battery that is found in many prior art solutions. These batteries have been a consistent source of reliability problems and can cause electrostatic discharge thus damaging the device.

Using this type of memory prevents erasure and modification of the contents of the memory 580, thus helping to ensure that the device cannot be reconfigured to perform a different function than what was intended. Further security may be had by using a message authentication function.

In this and the other included figures, the bitstream is encoded then decoded. In some applications, less than the entire bitstream is encoded. For example, there may be header information or the like which is common to all devices and may be generally known. If this information is encrypted, the key could be determined. Accordingly, this information is typically not encoded in embodiments of the present invention.

Figure 6:
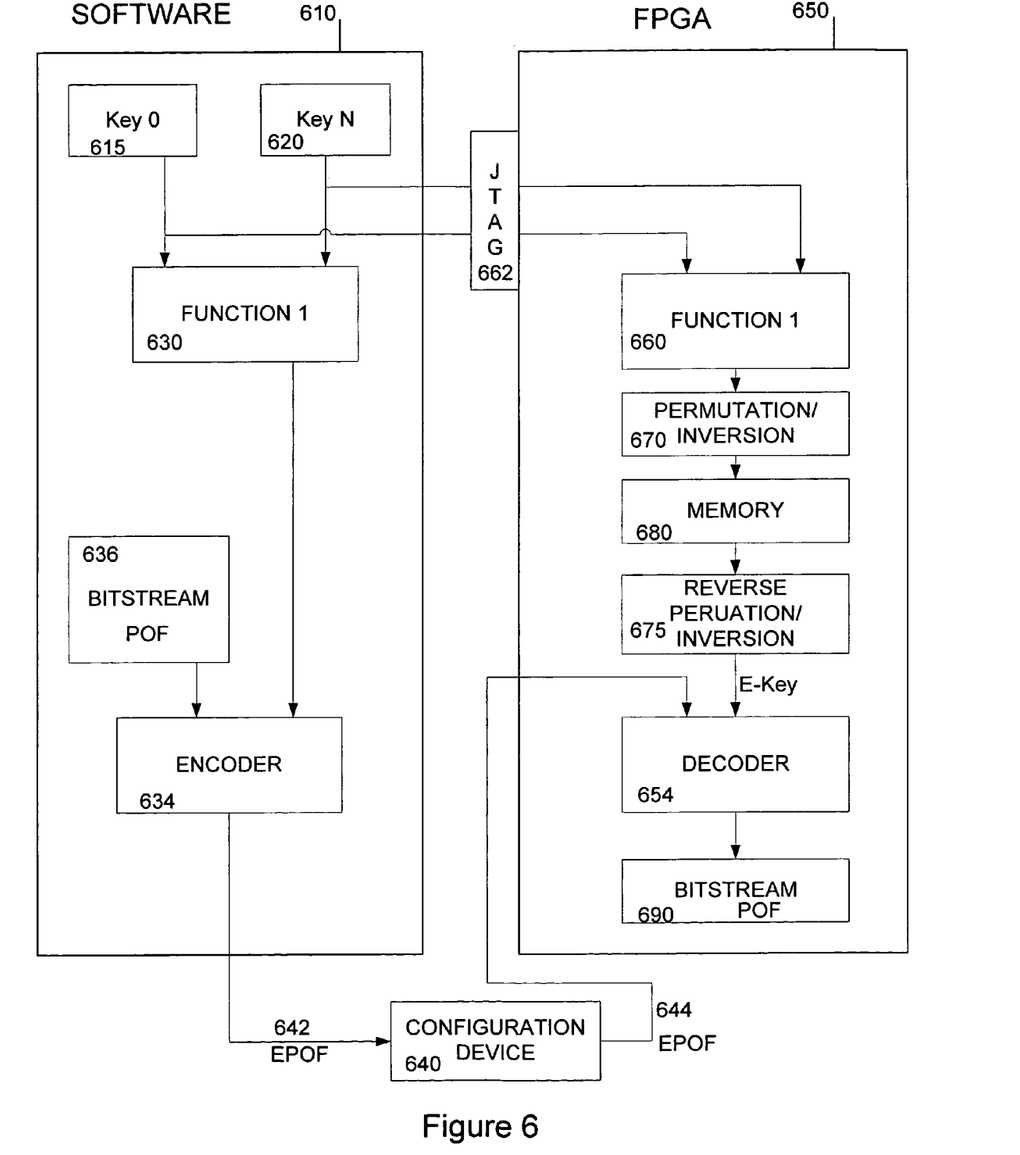
FIG. 6 illustrates circuits, software, and methods used to encode and decode a configuration bitstream according to another embodiment of the present invention.

FIG. 6 illustrates circuits, software, and methods used to encode and decode a configuration bitstream according to an embodiment of the present invention. This figure includes a software program or module 610, configuration device 640, and field programmable gate array 650.

Software module 610 receives one or more keys, Key 0 615 through Key N 620. Again, these keys may be provided by a user, software program or module, look-up table, or other appropriate source. For example, one or more of these keys may be provided by the software program 610. In various embodiments of the present invention, only one key is used, while, in other embodiments or two or more than two keys are used.

These keys are received by a first software module, Function 1, 630 which performs a function on them thus generating an encoded key, E-Key. Again, this function may include encryption, scrambling, exclusive-ORing, or other function or combination of these or other functions. A second software module, the encoder 634, receives the encoded E-key and the configuration bitstream, and provides an encoded bitstream as an output. The second software module may perform the same function as the first software module, or it may perform a different function. The second software module may perform an encryption, scrambling, exclusive-ORing, or other type or combination of these or other functions. The encoded bitstream is then provided via bus 642 to the configuration device 640 where it is stored for use once it and the FPGA are deployed in an end product or application.

The keys, Key 0 615 through Key N 620, are also provided to FPGA 650, for example through JTAG port 662. The FPGA 650 incorporates a first function block, Function 1 660, which receives the keys, Key 0 615 through Key N 620. The first function block, Function 1 660, performs a function on these keys to generate an encoded key, E-Key. As before, this function may include encryption, scrambling, exclusive ORing, or a combination of these or other functions. The encoded key, E-Key, is then received by a permutation and inversion circuit 670. The permutation and inversion circuit acts to disguise the encrypted key. The disguised encrypted key is stored in memory array 680.

In this way, the encrypted key is disguised from detection. Specifically, the encoded key itself is not stored, rather a version that has been permutated and inverted is stored. Further, in some embodiments, the key is safe from erasure or modification as it is stored in a plurality of one-time programmable fuses or stored in a memory whose write circuitry has been disabled.

Again, in typical applications, the configuration bitstream is encoded and stored in a configuration device and the inverted and permutated key is stored in memory 680 on the device in the device manufacturer or customer's factory. While the device is in its application and being configured, the following activities occur.

The output of the memory array 680 is received by reverse permutation inversion circuit 675, which generates or reconstructs the original encoded key, E-Key. A second function block, the decoder 654, receives the encoded key, E-Key, decodes the encoded bitstream from the configuration device 640, and provides a decoded configuration bitstream 690 to the FPGA 650. The second function block, the decoder 654, may provide the same function (or its reverse), or be the same function block, as the first function block, Function 1 650.

This function may include encryption (decryption), scrambling (descrambling), exclusive ORing, or a combination of these, their reverse, or other functions.

Again, the function provided by the function blocks, Function 1 and the decoder, may include a stand alone encryption (or decryption) function or an encryption function that is part of a larger more complex function. For example, an AES circuit may be used, though other encryption circuits may be alternately used, for example 3DES, or simply DES circuits, or other proprietary encryption methods and circuits may be used. Also, unconventional numbers of rounds of encryption may be used. For example, instead of a conventional 10 rounds of AES encryption, 6, 15, or other numbers of rounds may be used. In the future there will be other encryption schemes that will certainly be developed and may alternately be used. In a specific embodiment of the present invention, one or more keys having a length of 128 bits are used, though other lengths, such as 192 and 265 bits, may be used. Also, each device may have an individual key, each design may have a common key, each customer may have a key, or other arrangements may be made.

Figure 7:
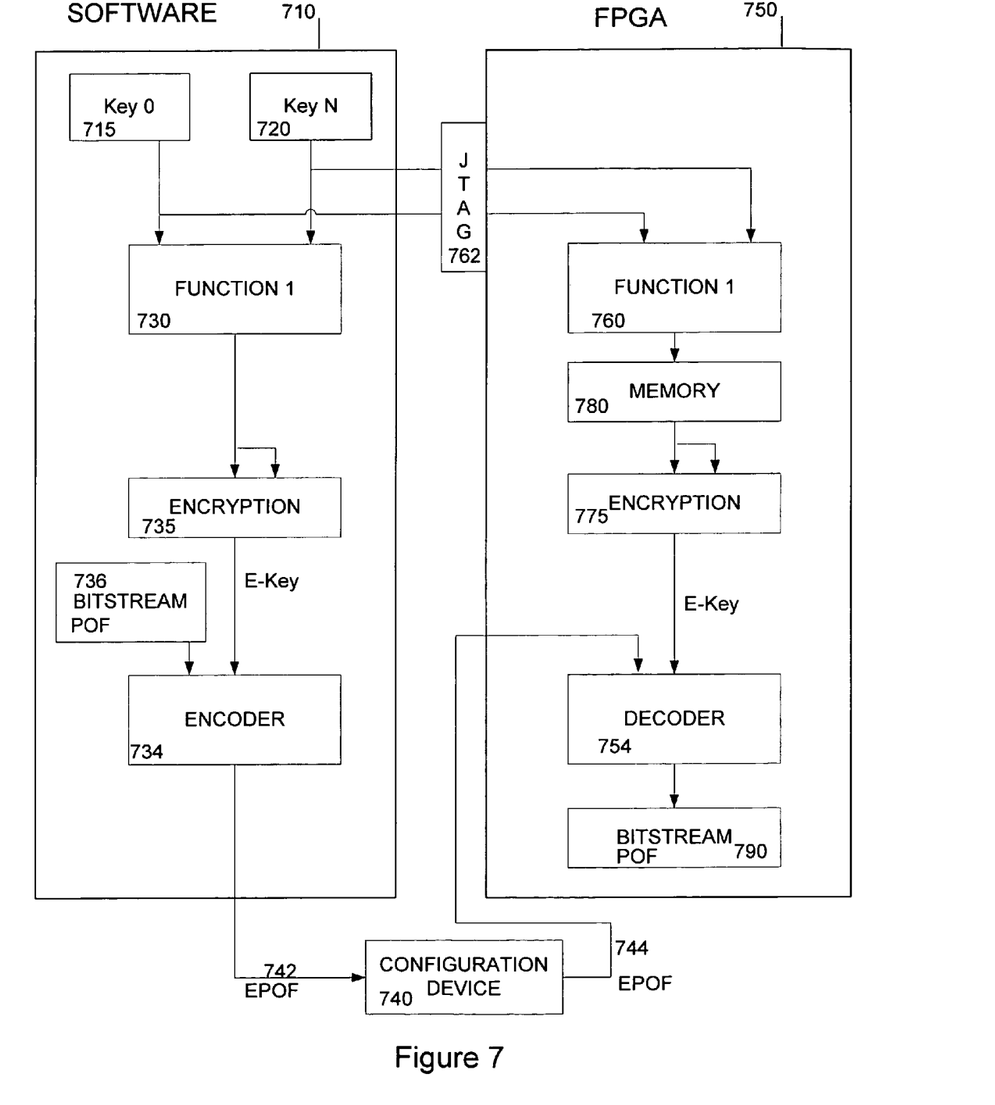
FIG. 7 illustrates circuits, software, and methods used to encode and decode a configuration bitstream according to another embodiment of the present invention.

FIG. 7 illustrates circuits, software, and methods used to encode and decode a configuration bitstream according to an embodiment of the present invention. This figure includes a software program or module 710, configuration device 740, and field programmable gate array 750.

Software module 710 receives one or more keys, Key 0 715 through Key N 720. These keys may be provided by a user, they may be provided or suggested by software, found in a look-up table or other source, or provided in some other manner. Only one key may be used, though two or more than two keys are typically used.

These keys are received by a first software module, Function 1 730, which performs a function on them and provides an output to an encryption software module 735. This function may include encryption, scrambling, exclusive ORing, or a combination of these or other functions. The output is encrypted or otherwise encoded with itself to generate an encrypted key, E-Key. A second software function module, the encoder 734, receives the configuration bitstream 736 and encodes it using the encrypted key, E-Key. The second software function module, the encoder 734, may be the same module as the first function module 730, or it may be a different software module. The encoded bitstream, E-POF, is then provided on bus 742 to the configuration device 740.

The keys, Key 0 615 through Key N 620, are also provided to FPGA 750, for example via JTAG interface 762. The FPGA 750 incorporates a first function block, Function 1 760, which receives the keys and generates an output that is provided to the memory 780 where it is stored. This first function block may mirror the first software function module 730. It may include encryption, scrambling, exclusive ORing, or a combination of these or other functions.

Again, in typical applications, the configuration bitstream is encoded and stored in a configuration device, and a key is stored in the memory 780 at the device manufacturer or customer's factory. When the FPGA device is in its end product and is being configured, the following activities occur.

The output of memory array 780 is received by an encryption or other encoding circuit 775, which encrypts or otherwise encodes the output of the memory array with itself to generate an encrypted key, E-Key. A second function block, the decoder 754, receives the E-Key and the encrypted bitstream on bus 744 from the configuration device 740 and provides an unencrypted configuration bitstream 790 to the FPGA 750. This second function block, the decoder 754, may include encryption, scrambling, exclusive ORing, or a combination of these or other functions.

In this way, once again, the configuration bitstream is disguised from detection. Specifically, the E-key itself if not stored, rather a key that is encrypted with itself to generate the E-Key is stored. Again, in some embodiments, the key is safe from erasure or modification since it is stored in a plurality of one-time programmable fuses or in a non-volatile memory array where the write enable circuitry has been disabled.

It should be noted that in this example, there is a "de-obfuscation" circuit, the encryption circuit 775, following the memory 780, but no corresponding "obfuscation" circuit ahead of the memory, as was the case in the examples of embodiments of the present invention shown in FIGS. 5 and 6. Accordingly, a corresponding software program or module 735 is included in software 710.

In this example, two function blocks, Function 1 760 and the decoder 754, are shown. In some embodiments, these are the same circuits reused for both functions, thought the signal flow may be reversed or otherwise altered to perform an inverse function. Further, the encryption circuit 775 may be the same circuit as the two function blocks. Alternately, two or three of these circuits may be separate individual circuits. The various function circuits may be encryption, scrambling, exclusive OR, or other types or combinations of these or other circuits.

In these examples, typically more than one key is received by software module Function 1 and FPGA function block Function 1. In some embodiments, only one key is received. In those embodiments, the Function 1 software module and function blocks may be optional and not included in the software and FPGA.

Figure 8:
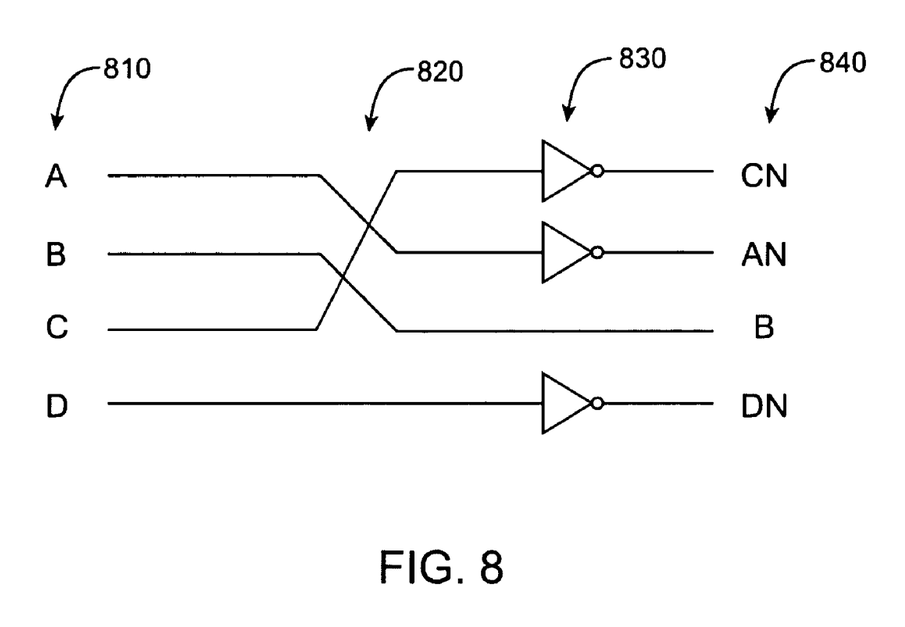
FIG. 8 is a simplified schematic of a permutation and inversion circuit consistent with an embodiment of the present invention.

FIG. 8 is a simplified schematic of a permutation and inversion circuit consistent with an embodiment of the present invention. In this a specific example, for simplicity, a four-bit key, ABCD, is obfuscated by permutation and inversion circuits.

Specifically, the order of the four-bit encryption key, ABCD 810 and is rearranged by permutation circuit 820. This permutation circuit may be as simple as wires crossing on an integrated circuit, or it may include electronic circuits such as multiplexers and other logic gates.

Following the permutation circuit, one or more bits are inverted by inverters 830. In this a specific example, the key, ABCD, is encrypted as CNANBDN 840. In various embodiments of the present invention, the permutation circuits and inversion circuits may appear in reverse order, they may be mixed, for an example some inverters may be placed in front of the permutation circuits while others are placed after, or other configurations maybe used.

Figure 9:
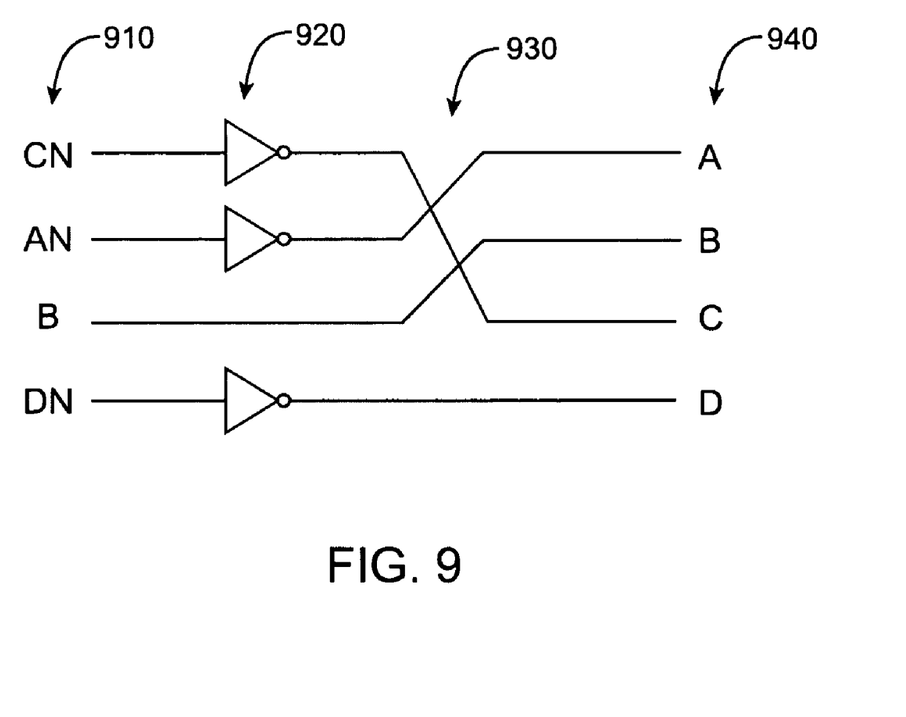
FIG. 9 is a simplified schematic of a reverse permutation and inversion circuit consistent with an embodiment of the present invention.

FIG. 9 is a simplified schematic of a reverse permutation and inversion circuit consistent with an embodiment of the present invention. In this specific example, the key that had been previously obfuscated as CNANBDN is recovered as ABCD.

Specifically, at least one bit of the stored key 910 is inverted by inverters 920. The result is then reverse permutated by permutation circuit 930. Again, this may be as simple as a number of wires crossing on an integrated circuit, or may involve electronic circuitry such as multiplexers or other logic gates.

Again, in this embodiment of the present invention, the permutation and inversion circuits may appear in reverse order, they may be mixed, or other configurations maybe used.

Figure 10:
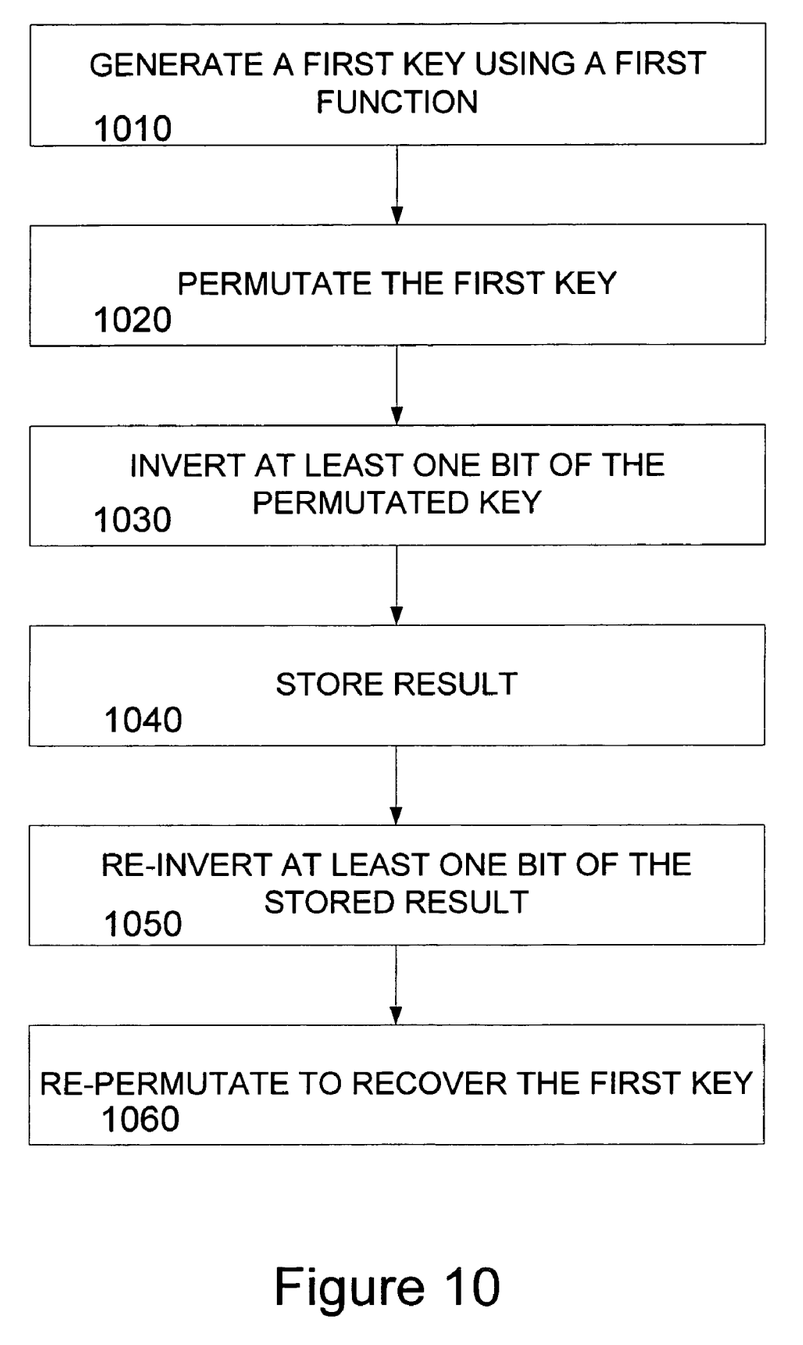
FIG. 10 is a flowchart of a method of obfuscating a key in a manner consistent with an embodiment of the present invention.

FIG. 10 is a flowchart of a method of obfuscating a key in a manner consistent with an embodiment of the present invention. In act 1010, a first key is generated using a first function. This key may be generated by encrypting a first key using a second key, or it may simply be a key provided by a user, software, look-up table, or other source, or it may be generated by scrambling, exclusive ORing, or other combination of functions. In various embodiments, this key may be encrypted by undergoing one or more rounds of AES encryption or by other encryption method. In act 1020, a first key is permuted, that is the order of its bits are rearranged to some degree. In act 1030, at least one bit is inverted. In act 1040, the result is stored in a memory, for example a fuse array or other one-time programmable (OTP) memory.

When an encrypted bitstream is to be decrypted, the result is retrieved from the OTP memory. At least one bit is inverted in act 1050 and a reverse permutation is performed in act 1060 in order to recover the first key. The first key may then undergo further encryption or decryption, or be directly used to decrypt an encrypted configuration bitstream.

Figure 11:
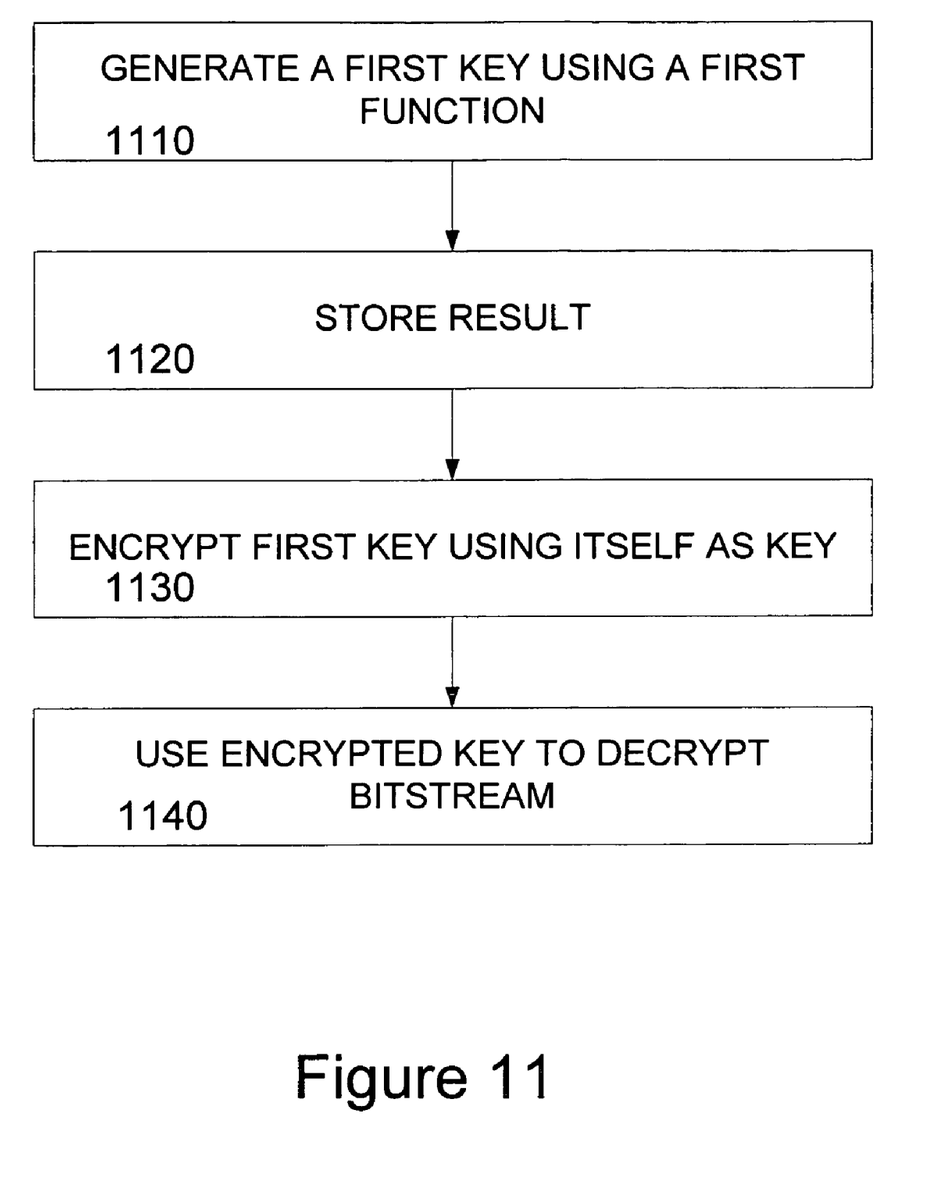
FIG. 11 is a flowchart of another method of obfuscating a key in a manner consistent with an embodiment of the present invention.

FIG. 11 is a flow chart of another method of obfuscating a key in a manner consistent with an embodiment of the present invention. As in act 1010, in act 1110 a first key is generated. In act 1120, the result is stored. In act 1130, the key is retrieved and encrypted using itself as the key. In act 1140, the encrypted key is used to decode an encoded bitstream.

The inversion, permutation, and encryption circuits described herein are specific examples of a general concept, which is the obfuscation of an encoding key by modifying it between the time it is retrieved from memory and used in decoding a configuration bitstream. In other embodiments, other forms of obfuscation may be used, including inversion, permutation, decoding, encoding, scrambling, encryption, or other methods.

Additional obfuscation may be achieved during layout and mask design of the permutation and inversion circuits, or other obfuscation circuits that are used, and the OTP memory. For example, additional fuses may be mixed with the fuses used to form the OTP memory. These fuses may be unused fuses, or they may be fuses that are used for other related or unrelated purposes. Any unused fuses may be blown in either a random or systematic fashion to further obfuscate the stored key.

Additionally, interconnect on the integrated circuit may be arranged in a manner to further obfuscate the circuit configuration and hence the stored key. For example, false connections may be used and nontraditional layers of interconnect such as source/drain resistors may be used.

It should be noted that no combination of these or other methods are likely to provide a encryption key that is completely undiscoverable to the most determined attacks. However, incorporation of embodiments of the present invention should result in a stored encryption key that is difficult to discover. This has the advantage of costing an attacker increased amounts of time and money to determine the encryption key, and thus a configuration bitstream.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The invention claimed is:

1. A method of protecting a configuration bitstream, the method comprising:

encoding at least a portion of a configuration bitstream using a first key to generate an encoded configuration bitstream;

storing the encoded configuration bitstream in a first memory on a first integrated circuit;

receiving, at a first circuit of a second integrated circuit, the first key, wherein the first key is received at the second integrated circuit from a source external to the second integrated circuit;

obfuscating, with the first circuit, the first key to generate a second key; and storing the second key in a second memory on the second integrated circuit, wherein the second memory is a non-volatile memory.

2. The method of claim 1 further comprising generating the first key by receiving a plurality of keys and performing a function on the plurality of keys.

3. The method of claim 2 wherein the function is encryption.

4. The method of claim 3 wherein the encryption is consistent with one of the group consisting of the data encryption standard, the triple data encryption standard, and the advanced encryption standard.

5. The method of claim 2, wherein the plurality of keys are received by a second circuit of the integrated circuit that performs the function on the plurality of keys.

6. The method of claim 1 wherein the configuration bitstream is encoded by the first key using encryption.

7. The method of claim 6 wherein the encryption is consistent with one of the group consisting of the data encryption standard, the triple data encryption standard, and the advanced encryption standard.

8. The method of claim 1, wherein the second integrated circuit is a field-programmable integrated circuit.

9. The method of claim 1 wherein the first key is obfuscated by permutating and inverting bits of the first key.

10. The method of claim 1 wherein the second memory is a one-time programmable memory.

11. The method of claim 1, further comprising:
retrieving the second key from the second memory;
receiving the configuration bitstream at the second integrated circuit; and
decoding the configuration bitstream using a result of a de-obfuscation of the second key, wherein the external source is not coupled with the first circuit during the decoding.

12. An integrated circuit comprising:
an input interface for receiving a plurality of input keys;
a first function block having an input coupled with the input interface, wherein the first function block generates a key by performing a function on the plurality of input keys;
a first circuit configured to receive the key, and further configured to obfuscate the key;
a memory configured to receive the obfuscated key from the first circuit, and further configured to store the obfuscated key; and
a second circuit configured to receive the obfuscated key from the memory, and further configured to de-obfuscate the obfuscated key.

13. The integrated circuit of claim 12 wherein the memory is a one-time programmable memory.

14. The integrated circuit of claim 13 wherein the one-time programmable memory comprises a plurality of fuses.

15. The integrated circuit of claim 12 wherein the first circuit comprises permutation and inversion circuits.

16. The integrated circuit of claim 12 wherein the recovered key is used to decode an encoded configuration bitstream.

17. The integrated circuit of claim 16 wherein the integrated circuit is a field programmable gate array.

18. The integrated circuit of claim 12, further comprising:
a decoder circuit that receives the key from the second circuit and that decrypts configuration data using the key.

19. A programmable integrated circuit comprising:
an input interface for receiving a plurality of input keys;
a first function block having an input coupled with the input interface, wherein the first function block generates a first key by performing a function on the plurality of input keys;
a memory configured to receive the first key from the first function block, and further configured to store the first key;
an encryption circuit that receives the first key from the memory and that encrypts the first key with itself to obtain an encryption key, wherein the encryption key is different than any of the input keys; and
a decoding circuit that uses the encryption key to decode configuration data that configures the programmable integrated circuit.

* * * * *